(12) United States Patent
Hada et al.

(10) Patent No.: US 10,916,225 B2
(45) Date of Patent: Feb. 9, 2021

(54) ATTENTION CALLING DISPLAY APPARATUS

(71) Applicant: NIPPON SEIKI CO., LTD., Niigata (JP)

(72) Inventors: Makoto Hada, Niigata (JP); Yuki Masuya, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 0 days.

(21) Appl. No.: 16/346,816

(22) PCT Filed: Nov. 21, 2017

(86) PCT No.: PCT/JP2017/041778
§ 371 (c)(1),
(2) Date: May 1, 2019

(87) PCT Pub. No.: WO2018/097120
PCT Pub. Date: May 31, 2018

(65) Prior Publication Data
US 2019/0279603 A1    Sep. 12, 2019

(30) Foreign Application Priority Data

Nov. 24, 2016    (JP) .................................. 2016-227885

(51) Int. Cl.
*G09G 5/38* (2006.01)
*B60R 1/00* (2006.01)
(Continued)

(52) U.S. Cl.
CPC .................. *G09G 5/38* (2013.01); *B60R 1/00* (2013.01); *B60R 21/00* (2013.01); *G08G 1/16* (2013.01);
(Continued)

(58) Field of Classification Search
CPC ........ B60R 2300/205; B60R 2300/207; B60R 2300/308; B60R 1/00; G08G 1/16;
(Continued)

(56) References Cited

U.S. PATENT DOCUMENTS

2012/0050139 A1*  3/2012  Wang ................. G02B 27/0101
                                                    345/7
2016/0004076 A1*  1/2016  Matsubara ......... G02B 27/0101
                                                    345/7
(Continued)

FOREIGN PATENT DOCUMENTS

DE        19813300 A  * 10/1999
EP        1785326 A1  *  5/2007 ............. B60K 35/00
(Continued)

OTHER PUBLICATIONS

European Search Report for EP 17874703 dated Jun. 25, 2020, 7 pages, Jun. 25, 2020. (Year: 2020).*
(Continued)

*Primary Examiner* — Jeffery A Brier
(74) *Attorney, Agent, or Firm* — McDermott Will & Emery LLP

(57) ABSTRACT

The present invention enables prevention of collision with a forward obstacle by prompting an appropriate driving operation according to the relative speed or the relative distance between a host vehicle and the forward obstacle. With respect to a standard display position at which a virtual image is normally displayed in association with an attention object in an actual scene ahead of a host vehicle, the virtual image is displayed at a corrected display position which is on the lower side in the vertical direction and/or on the near side in the depth direction when seen from a viewer,
(Continued)

depending on the relative speed or the relative distance between the host vehicle and the attention object in the actual scene.

11 Claims, 4 Drawing Sheets

(51) Int. Cl.
    *G08G 1/16*         (2006.01)
    *G09G 5/377*      (2006.01)
    *B60R 21/00*      (2006.01)

(52) U.S. Cl.
    CPC .............. *G08G 1/166* (2013.01); *G09G 5/377* (2013.01); *B60R 2300/207* (2013.01); *G09G 2340/0464* (2013.01); *G09G 2340/12* (2013.01); *G09G 2380/10* (2013.01)

(58) Field of Classification Search
    CPC .......... G08G 1/166; G09G 5/377; G09G 5/38; G09G 2340/0464; G09G 2340/0471; G09G 2340/0478; G09G 2340/0485; G09G 2340/12; G09G 2380/10; G06T 19/006; G02B 2027/014; G02B 2027/0141; G02B 2027/0145; G02B 2027/0185
See application file for complete search history.

(56) References Cited

U.S. PATENT DOCUMENTS

| | | | |
|---|---|---|---|
| 2016/0052394 A1* | 2/2016 | Yamada | G06T 19/006 |
| | | | 701/93 |
| 2016/0086305 A1* | 3/2016 | Watanabe | G06T 3/20 |
| | | | 345/672 |
| 2016/0159280 A1* | 6/2016 | Takazawa | B60R 1/00 |
| | | | 345/8 |
| 2016/0170487 A1 | 6/2016 | Saisho | |
| 2016/0216521 A1* | 7/2016 | Yachida | G02B 27/0179 |
| 2016/0266390 A1* | 9/2016 | Seo | G09G 3/001 |

FOREIGN PATENT DOCUMENTS

| | | | |
|---|---|---|---|
| JP | 05147456 A | * | 6/1993 |
| JP | 08-94756 A | | 4/1996 |
| JP | 2016-107945 A | | 6/2016 |

OTHER PUBLICATIONS

International Search Report issued in corresponding International Patent Application No. PCT/JP2017/041778, dated Feb. 27, 2018, with English Translation.

\* cited by examiner

ATTENTION CALLING DISPLAY APPARATUS

CROSS REFERENCE

This application is the U.S. National Phase under 35 U.S.C. § 371 of International Application No. PCT/JP2017/041778, filed on Nov. 21, 2017, which claims the benefit of Japanese Application No. 2016-227885, filed on Nov. 24, 2016, the entire contents of each are hereby incorporated by reference.

TECHNICAL FIELD

The present invention relates to an attention calling display apparatus for displaying a virtual image indicative of warning information to an occupant of a vehicle to provide collision with an obstacle ahead of the vehicle.

BACKGROUND ART

As a conventional attention calling display apparatus, there is known an apparatus for issuing a warning by using a head-up display device as disclosed in Patent Document 1. The attention calling display apparatus disclosed in Patent Document 1 detects a distance between a host vehicle and a forward vehicle positioned ahead of the host vehicle, and superposes and displays a mark image on the forward vehicle in a field of view of a driver by the head-up display device. By displaying the mark image, it is possible to notify a user of the position of an object (forward vehicle) to which attention should be paid.

CITATION LIST

Patent Literature

Patent Document 1: Japanese Unexamined Patent Application Publication No. H8-94756

SUMMARY OF THE INVENTION

Problems to be Solved by the Invention

Generally, as a relative speed between a host vehicle and a forward vehicle is faster (if the host vehicle is faster than the forward vehicle) or as a relative distance between a host vehicle and a forward vehicle is shorter, a time taken to avoid collision with the forward vehicle if an emergency occurs will be shortened.

A mark image for notifying a position of an object as disclosed in Patent Document 1 provides the position of the object; however, due to a difference in the relative speed and the relative distance between the host vehicle and the forward vehicle, as described above, it is not possible to prompt a viewer to carry out an appropriate driving operation, and there is room for improvement.

An object of the present invention is to prompt an appropriate driving operation according to a relative speed or a relative distance between a host vehicle and a forward obstacle to prevent collision with the forward obstacle.

A mark image for notifying a position of an object as disclosed in Patent Document 1 provides the position of the object; however, due to a difference in the relative speed and the relative distance between the host vehicle and the forward vehicle, as described above, it is not possible to prompt a viewer to carry out an appropriate driving operation, and there is room for improvement.

Solution to Problem

To solve the above-described problems, the present invention adopts the following means.

In an attention calling display apparatus of the present invention, according to a relative speed or a relative distance between a host vehicle and an attention object (forward obstacle) in an actual view, by displaying a virtual image on the lower side in the vertical direction and/or on the nearer side in the depth direction than a generally-used position where the virtual image is displayed in association with the attention object in the actual view ahead of the vehicle, the virtual image calling attention to a driver is substantially visually recognized in a nearer side than a position where the virtual image is generally displayed, and thus, it is possible to prompt the driver to perform an earlier driving operation or a driving operation allowing for a sufficient amount of operation to prevent collision with the forward obstacle.

The attention calling display apparatus according to a first aspect of the present invention is an attention calling display apparatus for displaying a virtual image (V) associated with an attention object (W) in an actual view (3) ahead of a vehicle, and includes an object information acquisition means (43, 45, 47) configured to acquire object information including information on at least a position of the attention object, a relative information acquisition means (43, 45, 46, 47) configured to acquire relative information including at least one of a relative speed and a relative distance between the attention object and a host vehicle, and a display control unit (40) configured to set a corrected display position (50s) on a lower side in a vertical direction and/or a nearer side in a depth direction than a standard display position (50r) being a normal position for displaying the virtual image determined according to a position of the attention object acquired by the object information acquisition means, at least based on the relative information acquired by the relative information acquisition means, and to display a nearby virtual image (Vs) at the corrected display position.

Effect of the Invention

According to the present invention, a nearby virtual image calling attention to a driver is visually recognized as being present on a nearer side (the side of the driver) than the position where a virtual image associated with an attention object is normally visually recognized, and thus, it is possible to prompt a driver to perform an earlier driving operation or a driving operation allowing for a sufficient amount of operation to prevent collision with the forward obstacle.

MODE FOR CARRYING OUT THE INVENTION

Figure 1:
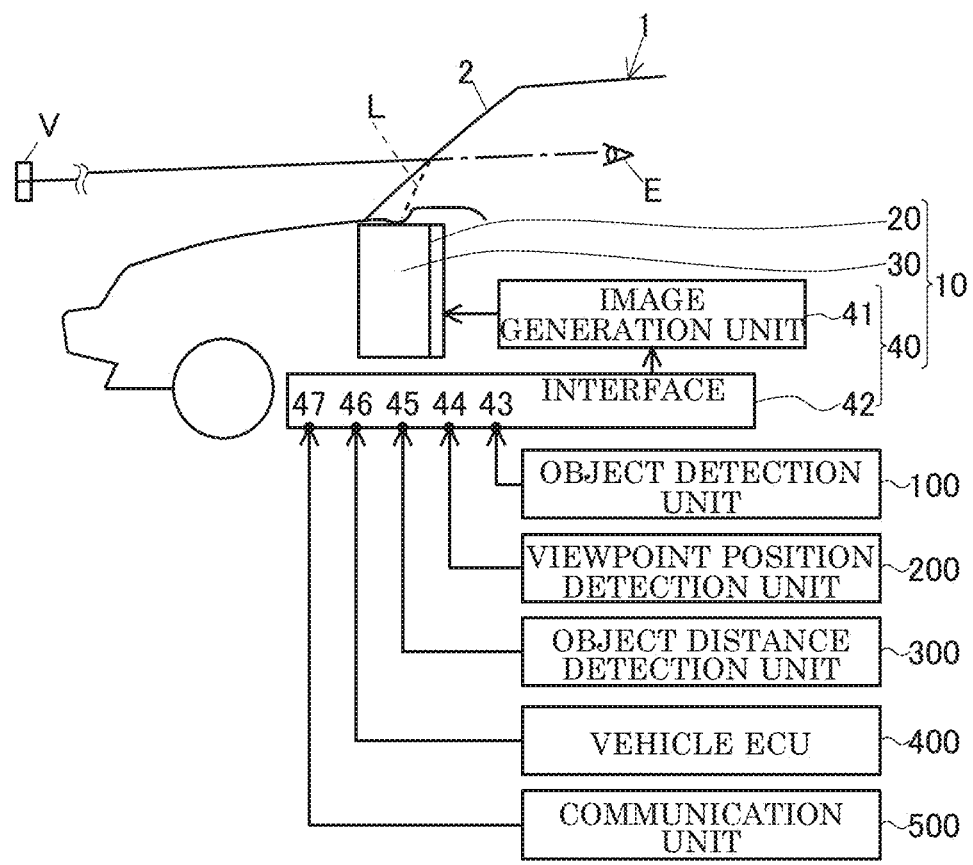
FIG. 1 is a diagram illustrating a configuration of an attention calling display apparatus according to an embodiment of the present invention.

An embodiment of an attention calling display apparatus 10 of the present invention will be described with reference to FIG. 1.

The attention calling display apparatus 10 is configured by a virtual image display device or the like for displaying a virtual image V, and examples of the attention calling display apparatus 10 includes a head-up display device or a head mounted display device. An embodiment where the attention calling display apparatus 10 is a head-up display device will be described below.

The attention calling display apparatus 10 is mounted on a host vehicle 1, and includes a display unit 20 configured to display an image, a projection unit 30 configured to project an image displayed by the display unit 20 on a front windshield 2 so that a virtual image V is visually recognized by a driver E, and a display control unit 40 configured to control an image displayed by the display unit 20.

The attention calling display apparatus 10 acquires various types of information from a below-described object detection unit 100, viewpoint position detection unit 200, object distance detection unit 300, vehicle ECU 400, communication unit 500 and the like, and based on the various types of information, changes an image displayed by the display unit 20 to change the virtual image V visually recognized by the driver E. The attention calling display apparatus 10 displays the virtual image V by associating it with a specific object W in an actual scene 3 ahead of the host vehicle 1 to emphasize a presence of the object W and prompt a driving operation so that collision with the object W can be avoided. The specific object W in the actual scene 3 displayed in association with the virtual image V to call attention is referred also to as an attention object W. In the following description, the virtual image V prompting attention to the presence of the attention object W will be described, and the attention calling display apparatus 10 may also display the virtual image V such as vehicle information of the host vehicle 1 and a route guidance.

The various types of detection units 100 to 500 provided in the host vehicle 1 will be described now. It should be noted that the various types of detection units to be described below may be provided in the attention calling display apparatus 10. Further, the various types of detection units 100 to 500 may be removably connected to the host vehicle 1 or the attention calling display apparatus 10 by wire or wireless. More specifically, a sensor unit or a mobile terminal having a function similar to those in the various types of detection units 100 to 500 may be connected by wire or wireless to the host vehicle 1 or the attention calling display apparatus 10.

The object detection unit 100 acquires object information including information on a position of the attention object W in the actual scene 3 ahead of the host vehicle 1. The object information includes at least position information of the attention object W to which attention is paid as a result of the virtual image V being displayed in the actual scene 3 ahead of the host vehicle 1, and is acquired from one or more cameras, infrared sensors, or LIDAR (Light Detection Ranging), for example. Examples of the attention object W include an obstacle existing on or near a road, a forward vehicle, a pedestrian, and a building. It is noted that the object detection unit 100 may be configured to measure the relative distance between the host vehicle 1 and the attention object W from the information on the position of the attention object W. Further, the object detection unit 100 may be configured to detect the relative speed between the host vehicle 1 and the attention object W, based on a temporal change of the information on the position of the attention object W. That is, the object detection unit 100 outputs the object information, the relative distance (relative information), and the relative speed (relative information) to an interface 42 (information input unit 43) of the attention calling display apparatus 10.

The viewpoint position detection unit 200 acquires viewpoint information on a viewpoint position of the driver E. The viewpoint information may include at least position information in an up-down direction (Y-axis direction) of a viewpoint of a viewer, may include position information in a left-right direction (X-axis direction) and a depth direction (Z-axis direction), and is obtained from a camera and an infrared camera, for example. The attention calling display apparatus 10 uses the object information on the position of the attention object W in the actual scene 3 obtained from the object detection unit 100 and the viewpoint information on the position of the viewpoint of the driver E obtained from the viewpoint position detection unit 200 to adjust a position for displaying the virtual image V so that the virtual image V can be displayed positionally accurately relative to the attention object W. It is noted that the viewpoint position detection unit 200 may not directly detect the viewpoint of the driver E, and may be configured to detect a position of a nose, a position of a head, a position of a seat, a seating height, and the like to estimate the position of the viewpoint of the driver E.

The object distance detection unit 300 is a distance measuring sensor configured to measure the relative distance between the host vehicle 1 and the attention object W, and includes, for example, a ranging camera and a radar sensor, and the like. The object distance detection unit 300 can individually recognize a plurality of attention objects W present ahead of the host vehicle 1, continuously or intermittently detect a distance between the host vehicle 1 and each of the attention objects W, and based on a comparison of the time difference, and calculate the relative speed to each of the attention objects W while using a speed of the host vehicle 1 as a standard. That is, the object distance detection unit 300 outputs the relative information including the relative distance and the relative speed between the host vehicle 1 and each of the attention objects W, to the interface 42 (information input unit 45) of the attention calling display apparatus 10.

The vehicle ECU 400 is an ECU provided in the host vehicle 1 and outputs vehicle speed information of the host vehicle 1 and braking information on a braking operation of the host vehicle 1 to the interface 42 (information input unit 46) of the attention calling display apparatus 10. It is noted that in addition to receiving the braking information from the vehicle ECU 400, the below-described display control unit 40 is capable of determining that the host vehicle 1 performs the braking operation when the relative distance between the host vehicle 1 and the attention object W increases constantly or abruptly.

The communication unit 500 is capable of vehicle-to-vehicle communication and with a communication infrastructure on the road, and, via the vehicle-to-vehicle communication and the communication infrastructure on the road, outputs the speed information of the attention object W, the relative information including the relative distance between the host vehicle 1 and the attention object W or the relative speed evaluated by a time difference therebetween, the object information on the position of the attention object W in the actual scene 3, and the like, to the interface 42 (information input unit 47) of the attention calling display apparatus 10. It is noted that the below-described display control unit 40 can also evaluate the relative speed between the host vehicle 1 and the attention object W, based on the vehicle speed information of the host vehicle 1 from the vehicle ECU 400 and the speed information of the attention object W from the communication unit 500.

As illustrated in FIG. 1, the display control unit 40 includes an image generation unit 41 configured to generate or adjust the image displayed by the display unit 20, and the interface 42. The interface 42 includes the information input unit 43 configured to receive mainly the object information including information on at least a position of the attention object W from the object detection unit 100, via a network such as an unillustrated vehicle-mounted LAN, the information input unit 44 configured to receive mainly the viewpoint information on the viewpoint position of the driver E from the viewpoint position detection unit 200, the information input unit 45 configured to receive mainly the relative information including the relative distance and/or the relative speed between the host vehicle 1 and the attention object W, from the object distance detection unit 300, the information input unit 46 configured to receive mainly the vehicle speed information of the host vehicle 1 and the braking information on the braking operation of the host vehicle 1, from the vehicle ECU 400, and the information input unit 47 configured to receive the speed information of the attention object W, the relative distance between the host vehicle 1 and the attention object W, and the relative information including the relative speed evaluated by the time difference therebetween, from the communication unit 500. It is noted that the interface 42 may receive serial input of the various types of these pieces of information, instead of parallel input. That is, the interface 42 functions as an object information acquisition means configured to acquire the object information including the information on at least the position of the attention object W, a relative information acquisition means configured to acquire the relative information including at least one of the relative speed and the relative distance between the attention object W and the host vehicle 1, and a braking information acquisition means configured to acquire the braking information on the braking operation of the host vehicle 1.

Normally, the image generation unit 41 displays the virtual image V to be substantially visually recognized at a standard actual view position 3r in the actual scene 3 having a predetermined positional relationship with the attention object W in the actual scene 3, based on the object information and the viewpoint information input from the interface 42. Examples of the predetermined positional relationship include a positional relationship in which the virtual image V is viewed to be superimposed on the attention object W, a positional relationship in which the virtual image V is viewed so that the virtual image V is offset in up-down and left-right directions by a predetermined distance from the attention object W, a positional relationship in which the virtual image V is viewed at a position offset in the depth direction in an actual space by a predetermined distance from the attention object W, and a positional relationship in which the virtual image V is substantially viewed to be offset in the depth direction in the actual space by a predetermined distance from the attention object W.

If the relative speed between the attention object W and the host vehicle 1 is equal to or greater than a predetermined threshold value or if the relative distance is equal to or less than the predetermined threshold value, the display control unit 40 executes an "attention calling display process" for changing the position for displaying the virtual image V in a virtual image displayable region 50 where the virtual image V can be displayed from the normal standard display position 50r to a corrected display position 50s.

When the display control unit 40 places the corrected display position 50s on the near side of the standard display position 50r (on the side of the driver E) in the real space, the virtual image V displayed at the corrected display position 50s can be visually recognized as being present on a nearer side, as compared to the virtual image V displayed at the standard display position 50r. Further, when the display control unit 40 places the corrected display position 50s on the lower side in the vertical direction of the standard display position 50r, when seen from the driver E, it is possible for the driver E to recognize that the virtual image V displayed at the corrected display position 50s is present on a substantially nearer side, as compared to the virtual image V displayed at the standard display position 50r. In the following description, the virtual image V displayed at the corrected display position 50s is recognized as being displayed on a nearer side, as viewed from the driver E, as compared to the virtual image V displayed at the standard display position 50r, and thus, the virtual image V displayed at the corrected display position 50s is also referred to as "nearby virtual image Vs". Specifically, a state how the nearby virtual image Vs is displayed will be described by using FIG. 2A, FIG. 2B, and FIG. 2C.

Figure 2A:
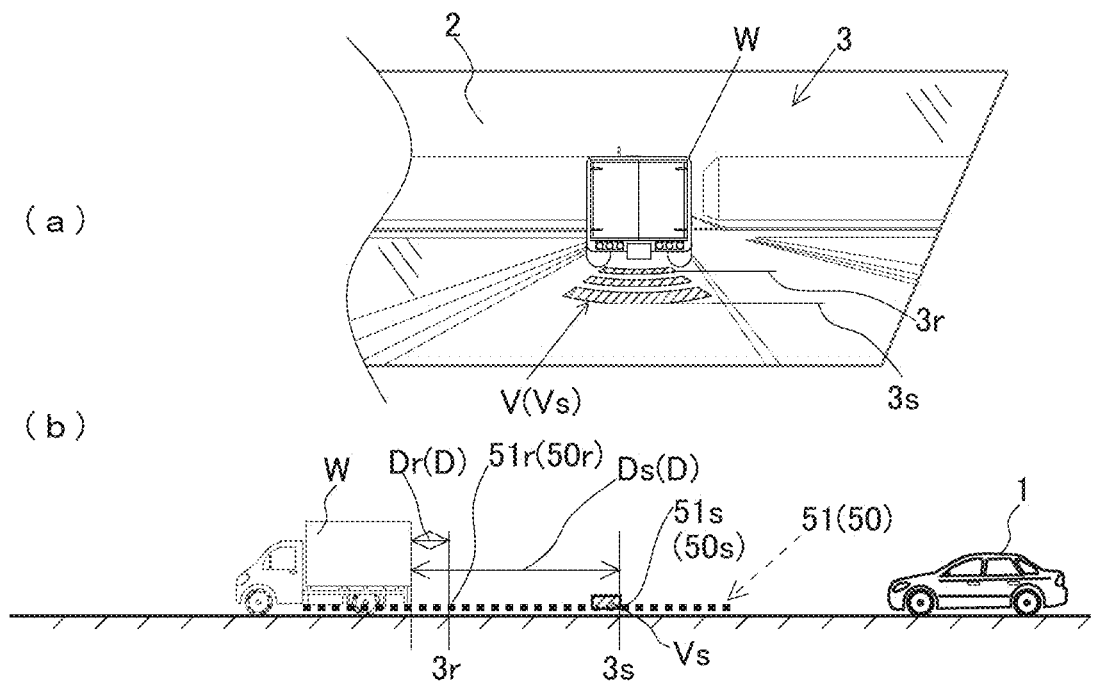
FIG. 2A is a view for explaining a virtual image displayed by the attention calling display apparatus of FIG. 1, where (a) is a view illustrating a scene visually recognized by a driver of a vehicle and (b) is a view visually recognized from a lateral side of the vehicle.

FIG. 2A illustrates an example where the virtual image displayable region 50 in which the attention calling display apparatus 10 can display the virtual image V is a first virtual image displayable region 51 having a surface shape extending from the near side to a far side. In this case, the display control unit 40 can adjust the position for displaying the virtual image V into the depth direction and the left-right direction viewed from the driver E, within the first virtual image displayable region 51. Normally, the display control unit 40 displays the virtual image V at a first standard display position 51r within the first virtual image displayable region 51 which is closer to the side of the driver E, by a standard distance Dr from the attention object W, and during execution of the attention calling display process, the display control unit 40 displays the nearby virtual image Vs at a first corrected display position 51s within the first virtual image displayable region 51 which is closer, by a set distance Ds longer than the normal standard distance Dr, to the side of the driver E from the attention object W. As a result, the position in the depth direction in the real space where the virtual image V is displayed is moved to a corrected actual view position 3s closer to the side of the driver E than the normal standard actual view position 3r, and thus, the virtual image V (nearby virtual image Vs) can be visually recognized as being present on a nearer side of the driver E.

Figure 2B:
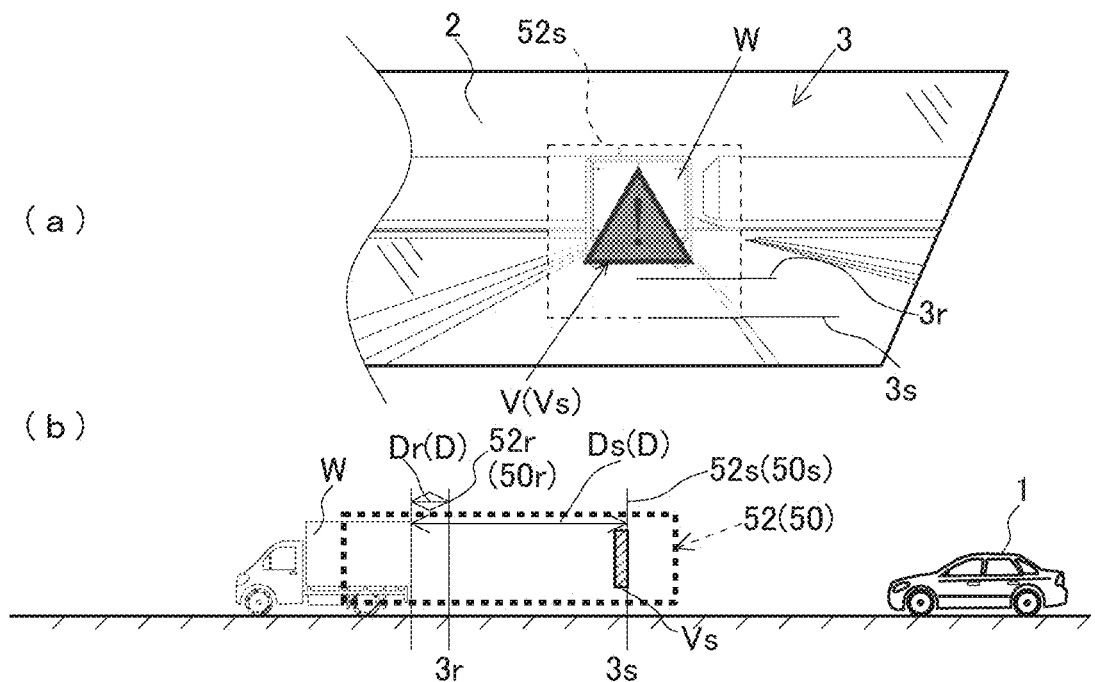
FIG. 2B is a view for explaining a virtual image displayed by the attention calling display apparatus of FIG. 1, where (a) is a view illustrating a scene visually recognized by a driver of a vehicle and (b) is a view visually recognized from a lateral side of the vehicle.

FIG. 2B illustrates an example where the virtual image displayable region 50 in which the attention calling display apparatus 10 can display the virtual image V is a second virtual image displayable region 52 having a solid shape extending from the near side to a far side. In this case, the display control unit 40 can adjust the position for displaying the virtual image V into the depth direction, the up-down direction, and the left-right direction viewed from the driver E, within the second virtual image displayable region 52. Normally, the display control unit 40 displays the virtual image V at a second standard display position 52r within the second virtual image displayable region 52 which is closer to the side of the driver E, by a standard set distance Dr from the attention object W, and during execution of the attention calling display process, the display control unit 40 displays the nearby virtual image Vs at a second corrected display position 52s within the second virtual image displayable region 52 which is closer, by a set distance Ds longer than the normal standard distance Dr, to the side of the driver E from the attention object W. As a result, the position in the depth direction in the real space where the virtual image V is displayed is moved to a corrected actual view position 3s closer to the side of the driver E than the normal standard actual view position 3r, and thus, the virtual image V (nearby virtual image Vs) can be visually recognized as being present on a nearer side of the driver E.

Figure 2C:
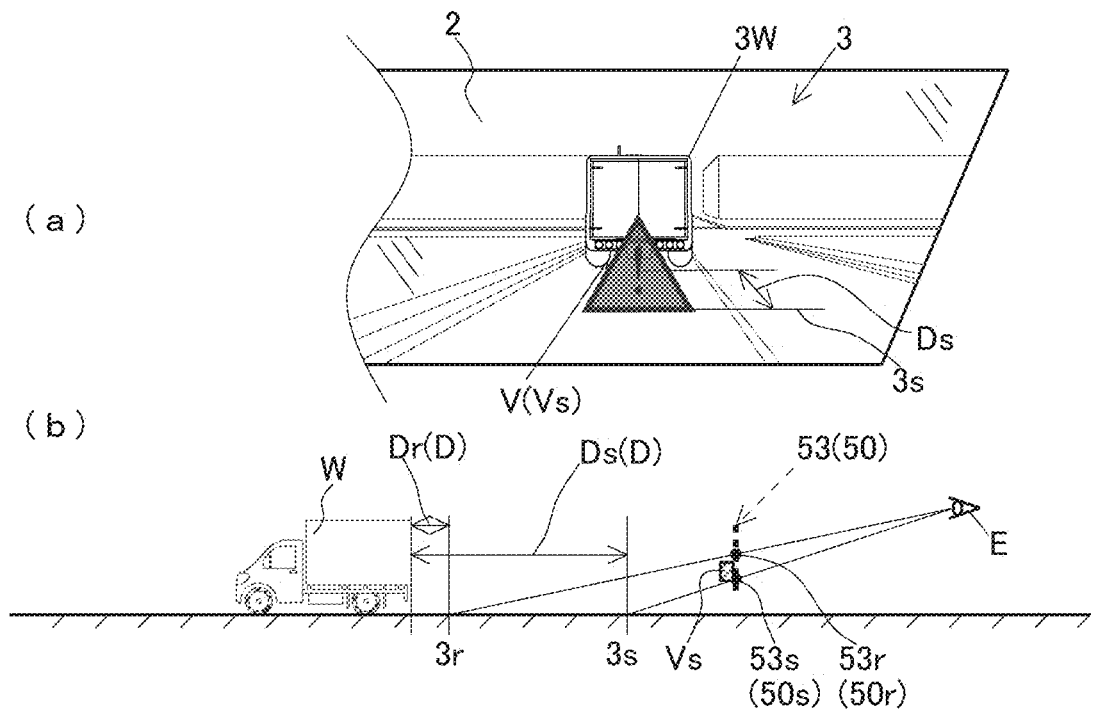
FIG. 2C is a view for explaining a virtual image displayed by the attention calling display apparatus of FIG. 1, where (a) is a view illustrating a scene visually recognized by a driver of a vehicle and (b) is a view visually recognized from a lateral side of the vehicle.

FIG. 2C illustrates an example where the virtual image displayable region 50 in which the attention calling display apparatus 10 can display the virtual image V is a third virtual image displayable region 53 having a surface shape extending in up-down and left-right directions. In this case, the display control unit 40 can adjust the position for displaying the virtual image V into the up-down direction and the left-right direction viewed from the driver E, within the third virtual image displayable region 53. The display control unit 40 normally displays the virtual image V at a third standard display position 53r within the third virtual image displayable region 53, and during execution of the attention calling display process, the display control unit 40 displays the nearby virtual image Vs at a third corrected display position 53s positioned on the lower side in the vertical direction relative to the third standard display position 53r within the third virtual image displayable region 53. As a result, the position of the actual scene 3 visually recognized while the virtual image V is superimposed is moved to the corrected actual view position 3s closer to the side of the driver E than the normal standard actual view position 3r, and thus, the virtual image V (nearby virtual image Vs) can be visually recognized as being present on a nearer side of the driver E.

Figure 3:
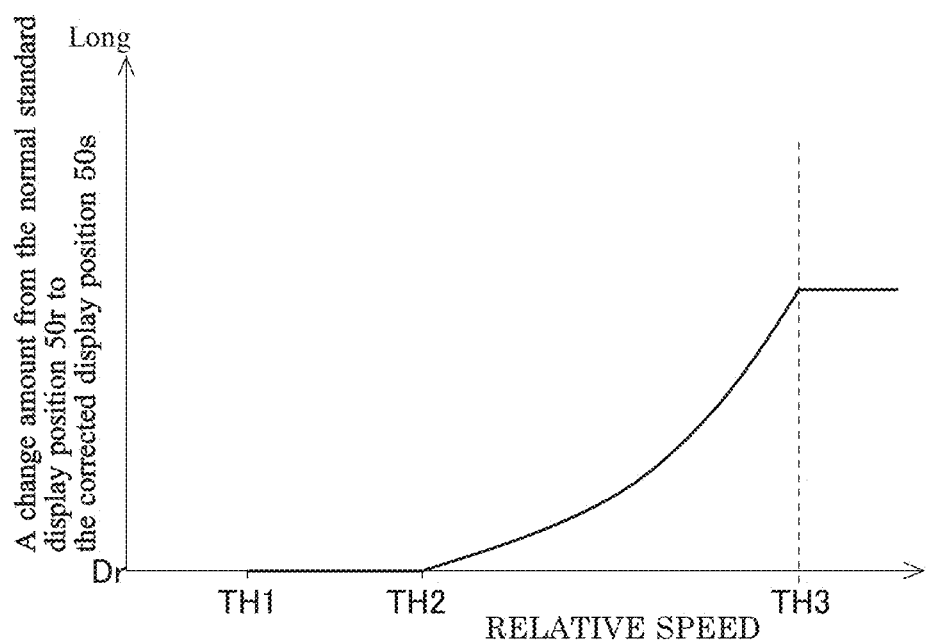
FIG. 3 is a graph showing a relationship between a relative speed and a change amount of a corrected display position in the attention calling display apparatus of FIG. 1.

FIG. 3 is a graph showing a relationship between the relative speed between the host vehicle 1 and the attention object W and a change amount from the normal standard display position 50r to the corrected display position 50s. For example, if the relative speed is less than a first threshold value TH1, the display control unit 40 does not display the virtual image V associated with the attention object W, and if the relative speed is equal to or more than the first threshold value TH1 and less than a second threshold value TH2, the display unit 40 continuously displays the virtual image V at the standard display position 50r irrespective of an increase of the relative speed. Further, if the relative speed is equal to or more than the second threshold value TH2, the display control unit 40 keeps the corrected display position 50s away from the standard display position 50r, based on the increase in the relative speed, and if the relative speed is equal to or more than a third threshold value TH3, the display control unit 40 keeps the corrected display position 50s.

As described above, the attention calling display apparatus 10 according to a first aspect of the present embodiment is an attention calling display apparatus for displaying the virtual image V associated with the attention object W within the actual scene 3 ahead of the vehicle, and includes the information input unit 43 (47) configured to acquire the object information including the information on at least the position of the attention object W, the information input unit 43 (45, 46, 47) configured to acquire the relative information including at least one of the relative speed and the relative distance between the attention object W and the host vehicle 1, and the display control unit 40 configured to set, at least based on the relative information acquired by the information input unit 43 (45, 46, 47), the corrected display position 50s on a lower side in a vertical direction and/or a near side in a depth direction than the standard display position 50r being a normal position for displaying the virtual image V determined according to the position of the attention object W acquired by the information input unit 43 (45, 46, 47), and display the nearby virtual image Vs at the corrected display position 50s. As a result, the nearby virtual image Vs for calling attention to the driver is visually recognized as being present on the nearer side (the side of the driver) than the attention object W, and thus, it is possible to prompt a driver to perform an earlier driving operation or a driving operation allowing for a sufficient amount of operation to prevent collision with the forward obstacle (attention object W).

Further, the display control unit 40 may continuously update the corrected display position 50s. As a result, according to a change of the relative speed between the host vehicle 1 and the attention object W in the actual scene 3 or a change of the relative distance therebetween, the display position of the nearby virtual image Vs is updated to appropriately adjust the driving operation while confirming the display position of the nearby virtual image Vs.

Further, the display control unit 40 may update the corrected display position 50s at each predetermined time interval, and based on a maximum value of the relative speed in the predetermined time interval or a minimum value of the relative distance therein, determine the corrected display position 50s. For example, the display control unit 40 may receive the relative speed in the predetermined time interval a plurality of number of times, and based on a maximum value of the plurality of relative speeds, and may determine the corrected display position 50s for displaying the nearby virtual image Vs. As a result, according to a continuous change in the relative speed or a continuous change in the relative distance between the host vehicle 1 and the attention object W in the actual scene 3, it is possible to prevent the display position (corrected display position 50s) of the nearby virtual image Vs from being frequently updated, and consequently, the driver E can easily concentrate on driving and due to the display of the nearby virtual image Vs, to prompt the driver to perform an earlier driving operation or a driving operation allowing for a sufficient amount of operation.

Further, it is preferable that the display control unit 40 adjusts the corrected display position 50s so that the nearby virtual image Vs is substantially visually recognized at the corrected actual view position 3s in the actual view apart by a set distance D from the attention object W, and according to the relative information, changes the set distance D. As a result, the nearby virtual image Vs displayed at the corrected display position 50s can be recognized more stereoscopically as being present at a specific position (corrected actual view position 3s) apart by the set distance D from the attention object W in the real space of the actual scene 3.

Further, the information input unit 46 (braking information acquisition means) configured to acquire the braking information on the braking operation of the host vehicle 1 may be further provided, and if the braking operation of the host vehicle 1 is detected, based on the braking information acquired from the information input unit 46, the display control unit 40 may fix the set distance D. Specifically, when the braking operation of the host vehicle 1 is detected, the display control unit 40 fixes the set distance D to the latest set distance D (when the braking operation is detected), and continuously updates the corrected display position 50s for displaying the nearby virtual image Vs so that the nearby virtual image Vs is substantially visually recognized in a continuous manner at a position apart by the set distance D from the attention object W. Thus, when the braking operation of the host vehicle 1 is performed, a sense of distance between the attention object W and the visually recognized nearby virtual image Vs is fixed, and thus, the driver E can adjust the braking operation with reference to the nearby virtual image Vs. After elapse of a predetermined time interval after the braking operation of the host vehicle 1 is started (ended), the display control unit 40 updates the corrected display position 50s according to the current (latest) relative information.

Figure 4:
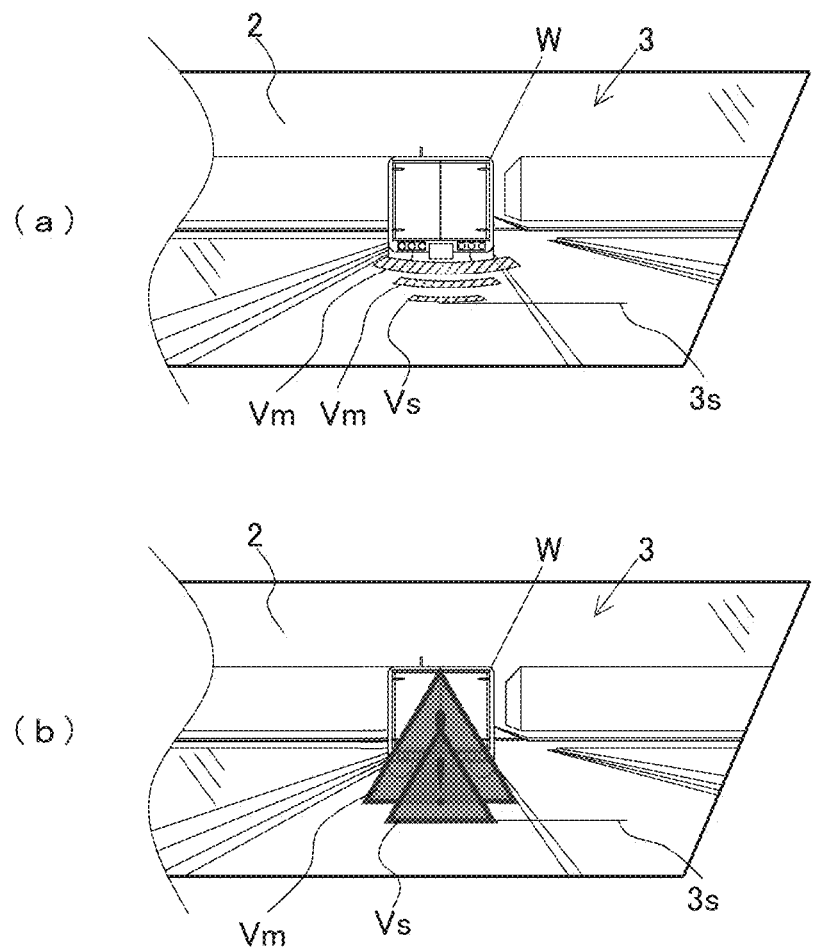
FIG. 4 is a view illustrating a modification of the virtual image displayed by the attention calling display apparatus of FIG. 1 and illustrating a scene visually recognized by a driver of a vehicle.

Further, as illustrated in FIG. 4, the display control unit 40 may display at least one intermediate virtual image Vm at a position substantially visually recognized as being present between the attention object W and the nearby virtual image Vs. As a result, it is possible for the driver E to recognize a difference in distance between the attention object W and the nearby virtual image Vs. In other words, this can provide a stronger impression that the nearby virtual image Vs is substantially displayed on the side of the driver E.

Further, the display control unit 40 may increase the number of intermediate virtual images Vm to be displayed, according to the relative information. Specifically, the display control unit 40 may increase the number of intermediate virtual images Vm along with an increase of the set distance D which is determined according to the relative information and where the nearby virtual image Vs is substantially visually recognized as being apart from the attention object W. The number of intermediate virtual images Vm is increased or decreased for the driver E to more easily recognize the increase or decrease in the difference in distance between the attention object W and the nearby virtual image Vs.

Further, as illustrated in FIG. 4, the display control unit 40 may display the intermediate virtual image Vm and the nearby virtual image Vs in the substantially same shape and with a different display mode. The intermediate virtual image Vm and the nearby virtual image Vs are formed in the same shape for the driver E to recognize that the intermediate virtual image Vm and the nearby virtual image Vs are displayed for the same attention object W. Further, the intermediate virtual image Vm and the neighboring virtual image Vs are displayed in the different display mode for the driver E to easily distinguish the nearby virtual image Vs from the intermediate virtual image Vm, and to easily pay attention to the nearby virtual image Vs.

Further, as illustrated in FIG. 4, the display control unit 40 may display the intermediate virtual image Vm as being visually recognized larger than the nearby virtual image Vs. This also makes it easy to distinguish the nearby virtual image Vs from the intermediate virtual image Vm.

Further, as the host vehicle 1 approaches the attention object W, the display control unit 40 may sequentially hide the virtual images close to the host vehicle 1 in order of the nearby virtual image Vs and the intermediate virtual image Vm, or reduce the visibility thereof. This makes it possible for the driver E to be impressed more strongly that the nearby virtual image Vs is displayed on the nearer side of the driver E than the intermediate virtual image Vm.

Further, if the relative speed does not decrease or the relative distance does not increase for at least a predetermined time interval, the display control unit 40 may further adjust the corrected display position 50s to a much lower side in the vertical direction and/or a much nearer side in the depth direction. As a result, if there is no improvement of the driving operation for a predetermined time interval, since the nearby virtual image Vs displayed at the corrected display position 50s is visually recognized on a much nearer side of the driver E, it is possible to prompt the driver E to improve the driving operation.

Further, as described above, if the relative speed is equal to or more than the third threshold value TH3 in which the corrected display position 50s is held irrespective of the rise in the relative speed and if at least the predetermined time interval has elapsed, the display control unit 40 may blink the near virtual image Vs to prompt the driver E to pay attention more strongly.

Figure 5:
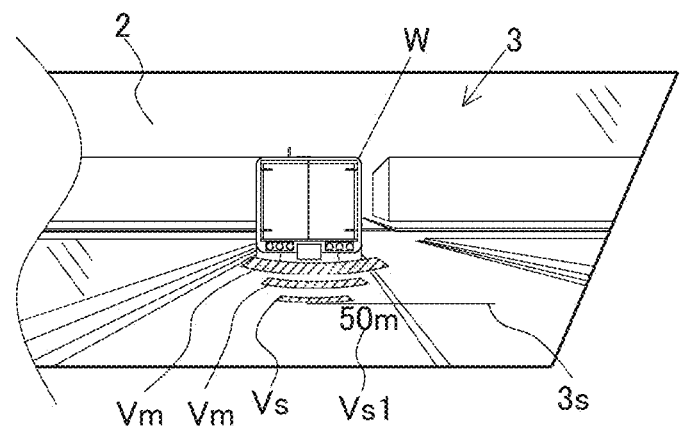
FIG. 5 is a view illustrating a modification of the virtual image displayed by the attention calling display apparatus of FIG. 1 and illustrating a scene visually recognized by a driver of a vehicle.

As illustrated in FIG. 5, in the vicinity of the near virtual image Vs, the display control unit 40 may display, as a virtual image Vs1, a distance from a position for displaying the near virtual image Vs or a position with which the near virtual image Vs is associated to the host vehicle 1. As a result, the distance to the nearby virtual image Vs becomes clear to prompt the driver to perform an earlier driving operation or a driving operation allowing for a sufficient amount of operation, based on the distance between the host vehicle 1 and the near virtual image Vs.

It is noted that the present invention shall not be limited in any way by the embodiment. Modifications (including deletion of constituent elements) may be appropriately added as long as the gist of the present invention is not changed.

DESCRIPTION OF REFERENCE NUMERALS

1 Host vehicle
2 Front windshield (transmission reflection unit)
3 Actual view
3r Standard actual view position
3s Corrected actual view position
10 Attention calling display apparatus
20 Display unit
30 Projection unit
40 Display control unit
41 Image generation unit
42 Interface (object information acquisition means, relative information acquisition means, braking information acquisition means)
43, 44, 45, 46, 47 information input unit (object information acquisition means, relative information acquisition means, braking information acquisition means)
50 Virtual image displayable region
50r Standard display position
50s Corrected display position
51 First virtual image displayable region
51r First standard display position 51s First corrected display position
52 Second virtual image displayable region
52r Second standard display position
52s Second corrected display position
53 Third virtual image displayable region
53r Third standard display position
53s Third corrected display position
100 Object detection unit
200 Viewpoint position detection unit
300 Object distance detection unit
400 Vehicle ECU
500 Communication unit
D Set distance
Dr Standard distance
E Driver
V Virtual image
Vm Intermediate virtual image
Vs Nearby virtual image
W Attention object

The invention claimed is:

1. An attention calling display apparatus for displaying a virtual image associated with an attention object in an actual view ahead of a vehicle, the attention calling display apparatus comprising:
an object information acquisition means configured to acquire object information including information on at least a position of the attention object;
a relative information acquisition means configured to acquire relative information including at least one of a relative speed and a relative distance between the attention object and a host vehicle; and
a display control unit configured to:
acquire viewpoint information on a viewpoint position of a driver of the host vehicle;
display the virtual image at a standard display position such that the virtual image is visually recognized from the viewpoint position of the driver to be a standard distance away from the attention object in the actual scene; and
when the relative speed is equal to or greater than a predetermined speed threshold value or when the relative distance is equal to or less than a predetermined distance threshold value, display the virtual image at a corrected display position such that the virtual image is visually recognized from the viewpoint position of the driver to be a set distance away from the attention object in the actual scene,
wherein the set distance is greater than the standard distance such that when the virtual image is displayed at the corrected display position, 1) the virtual image is visually recognized by the viewpoint position of the driver to be farther away from the attention object than when the virtual image is displayed at the standard display position and 2) the virtual image is visually recognized by the viewpoint position of the driver to be on a lower side in a vertical direction and/or a nearer side in a depth direction than when virtual image is displayed at the standard display position.

2. The attention calling display apparatus according to claim 1, wherein the display control unit continuously updates the corrected display position.

3. The attention calling display apparatus according to claim 1,
wherein the display control unit updates the corrected display position at each predetermined time interval, and
wherein the display control unit determines the corrected display position based on a maximum value of the relative speed in the predetermined time interval or a minimum value of the relative distance therein.

4. The attention calling display apparatus according to claim 1, further comprising:
a braking information acquisition means configured to acquire braking information on a braking operation of a host vehicle,
wherein if the braking operation of the host vehicle is detected, the display control unit fixes the set distance, based on the braking operation acquired from the braking information acquisition means.

5. The attention calling display apparatus according to claim 1, wherein the display control unit displays at least one intermediate virtual image at a position substantially visually recognized as being present between the attention object and the virtual image displayed at the corrected display position.

6. The attention calling display apparatus according to claim 5, wherein the display control unit increases a number of the intermediate virtual images to be displayed, according to the relative information.

7. The attention calling display apparatus according to claim 5, wherein the display control unit displays the intermediate virtual image and the virtual image displayed at the corrected display position in a substantially same shape and with a different display mode.

8. The attention calling display apparatus according to claim 5, wherein the display control unit displays the intermediate virtual image as being visually recognized to be larger than the virtual image displayed at the corrected display position.

9. The attention calling display apparatus according to claim 5, wherein if the host vehicle approaches the attention object within a predetermined threshold value, as the host vehicle approaches the attention object, the display control unit sequentially hides virtual images close to the host vehicle in order of the virtual image displayed at the corrected display position and the intermediate virtual image, or reduces a visibility thereof.

10. The attention calling display apparatus according to claim 1, wherein if the relative speed does not decrease or the relative distance does not increase for at least a predetermined time interval, the display control unit adjusts the corrected display position to a position visually recognized by the viewpoint position of the driver on a much lower side in a vertical direction and/or a much nearer side in a depth direction.

11. The attention calling display apparatus according to claim 6, wherein the display control unit displays the intermediate virtual image and the virtual image displayed at the corrected display position in a substantially same shape and with a different display mode.

* * * * *